(12) United States Patent
Proehl et al.

(10) Patent No.: US 6,532,589 B1
(45) Date of Patent: Mar. 11, 2003

(54) METHOD AND APPARATUS FOR PROVIDING A CALENDAR-BASED PLANNER IN AN ELECTRONIC PROGRAM GUIDE FOR BROADCAST EVENTS

(75) Inventors: Andy Proehl, San Francisco, CA (US); Kim Mingo, Brooklyn, NY (US); Kazuto Mugura, London (GB); Yuko S. Nishikawa, La Jolla, CA (US); Jenny S. Chow, Oceanside, CA (US)

(73) Assignees: Sony Corp., Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/276,479

(22) Filed: Mar. 25, 1999

(51) Int. Cl.$^7$ .......................... H04N 7/173; H04N 5/445
(52) U.S. Cl. .............................. 725/40; 725/46; 725/52; 725/58; 725/104
(58) Field of Search ............................. 725/58, 52, 47, 725/46, 45, 44, 43, 40, 39, 104; 386/83, 1; 345/717, 719; 348/906, 569, 563, 564; H04N 7/173, 5/445

(56) References Cited

U.S. PATENT DOCUMENTS

| | | | | |
|---|---|---|---|---|
| 5,880,768 A | * | 3/1999 | Lemmons et al. | 725/41 |
| 6,018,372 A | * | 1/2000 | Etheredge | 348/569 |
| 6,262,722 B1 | * | 7/2001 | Allison et al. | 725/39 |
| 6,266,814 B1 | * | 7/2001 | Lemmons et al. | 725/44 |
| 6,348,932 B1 | * | 2/2002 | Nishikawa et al. | 345/719 |
| 6,351,270 B1 | * | 2/2002 | Nishikawa et al. | 725/133 |

* cited by examiner

Primary Examiner—Chris Grant
(74) Attorney, Agent, or Firm—Blakely Sokoloff Taylor & Zafman LLP (57) ABSTRACT

A method and apparatus for providing a calendar-based on-screen planner in an electronic program guide for broadcast events are provided, wherein at least one electronic program guide is generated and displayed representing programming on a number of channels. A first on-screen planner is generated comprising at least one monthly calendar view. The first on-screen planner, which may be accessed from the electronic program guide, provides for a review of selected broadcast activity for a number of days of a selected month. The selected broadcast activity is selected from a group comprising broadcasts selected for automatic tuning, broadcasts selected for recording, and pay-per-view broadcasts selected for purchase. A second on-screen planner is generated comprising at least one daily calendar view. The second on-screen planner, which may be accessed from the first on-screen planner, provides for review and editing of the selected broadcast activity for at least one day of the selected month. The electronic program guide and the on-screen planners are displayed on the screen in response to a user selection.

33 Claims, 8 Drawing Sheets

METHOD AND APPARATUS FOR PROVIDING A CALENDAR-BASED PLANNER IN AN ELECTRONIC PROGRAM GUIDE FOR BROADCAST EVENTS

FIELD OF THE INVENTION

The present invention relates to the presentation of broadcast information and related event scheduling information for a multiple channel television broadcast system. Specifically, the present invention relates to the presentation of an on-screen calendar-based graphic user interface for scheduling and reviewing broadcast events.

BACKGROUND OF THE INVENTION

Television broadcasting technology has improved tremendously since its inception. Today, television signals are broadcasted on the airwaves, through cables, and via satellite. The number of stations accessible today has increased to hundreds of stations. To select a program to view, many viewers simply "channel surf" until they find a channel that has a desirable program. Channel surfing refers to the process of using the channel "+" or "−" key to sequentially view each channel. Although some viewers find channel surfing among hundreds of stations enjoyable, most viewers prefer a more direct method for selecting a program to view.

Some prior art television channel selection guides provide a television channel selection guide which displays a listing of the channels typically in numeric order and the titles of the programs broadcasted or to be broadcasted on the channels. The viewer or user of the system may then select the channel by entering in the channel number or selecting a program. The system responds by removing the guide displayed and tuning to the station selected and displaying the broadcast signals of the station.

In the current generation of broadcasting system technology, a viewer is provided with many options regarding programs that are available for broadcast. These options include, but are not limited to, channel surfing among program descriptions while watching a particular program on one channel. This option is typically accessed through a graphical user interface presented in one of two formats. In one format, the graphical user interface is a transparent electronic program guide that is superimposed over a broadcasted program. In a second format, the graphical user interface is an electronic program guide that is displayed along with a broadcasted program where the broadcasted program is displayed as reduced in size so that no portion of the electronic program guide covers the program. Both of these graphical user interfaces allow the user to watch one program while accessing program information for a number of other programs that are available for broadcast.

Furthermore, while having many options regarding broadcast programming, current broadcasting system technology provides the user with integrated broadcast receivers having improved capability in the areas of timer-based automatic tuning and recording, program reminders, and purchase of pay-per-view broadcast events. However, with the aggregation of numerous varieties of programming content and the addition of Internet receivers and recording devices to audio/visual receiver systems, the scheduling of broadcast activities has become difficult to accurately present and track. Therefore, as the number of viewer options increases, so to does the need for a user-friendly system interface that accommodates all users by allowing for scheduled programming information to be presented in a format that is easy-to-read and understand. Thus, while prior art planners provide scheduled broadcast activity and selected pay-per-view purchases in a text list combined on one screen, it would be advantageous to have a broadcast activity planner that allows the user to seamlessly view and edit all broadcast-related activity and move between program guide and planner screens.

SUMMARY OF THE INVENTION

A method and apparatus for providing a calendar-based on-screen planner for broadcast events along with an electronic program guide are provided. According to one aspect of the invention, at least one electronic program guide is generated and displayed representing programming on a number of channels. A first on-screen planner, or television (TV) planner, is generated comprising at least one monthly calendar view. Previous months, the current month, and future months may be selected using the TV planner. The TV planner, which may be accessed from the electronic program guide, provides for a review of selected broadcast activity for a number of days of a selected month. The selected broadcast activity is selected from a group comprising broadcasts selected for automatic tuning, broadcasts selected for recording, and pay-per-view broadcasts selected for purchase. A second on-screen planner, or daily view TV planner, is generated comprising at least one daily calendar view. The daily view TV planner, which may be accessed from the TV planner, provides for review and editing of the selected broadcast activity for at least one selected day of the selected month. The daily view TV planner comprises a chronological list of each selected broadcast activity for a selected day of a selected month; the chronological list further comprises program titles, channel numbers, time, and a rating for each selected broadcast activity. The selected broadcast activity is represented on the TV planner and the daily view TV planner using a number of icons comprising a first set of icons for a future selected broadcast activity and a second set of icons for a completed selected broadcast activity. The electronic program guide and the on-screen planners are displayed on the screen in response to a user selection. The display of the electronic program guide and the on-screen planners may be superimposed over a broadcast of the currently selected and displayed program.

These and other features, aspects, and advantages of the present invention will be apparent from the accompanying drawings and from the detailed description and appended claims which follow.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described is a direct broadcast satellite system; the broadcast system may also be a digital television system. Furthermore, the broadcast system described herein may be integrated with an Internet receiver or World Wide Web browser. However, it is readily apparent to one skilled in the art that other broadcast systems which have the capability of receiving and displaying a multiplicity of stations may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

It is readily apparent to one skilled in the art that additional functions can be added to the process and functions modified or removed and still be within the spirit and scope of the invention. The system provides an innovative and user friendly access to a wealth of information regarding programming available through the broadcasting system. In the present invention a number of functions are selectable through the remote control device. It is apparent that these functions may be selectable through other devices such as a joystick or other means such as an on screen menu.

Figure 1:
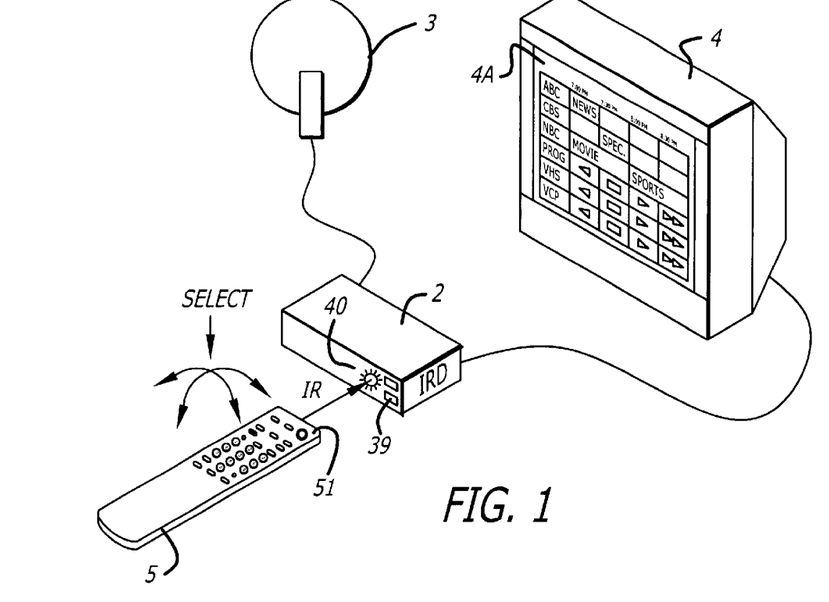
FIG. 1 is a diagram of a Direct Satellite System (DSS) of an embodiment of the present invention.

FIG. 1 is a diagram of a Direct Satellite System (DSS) of an embodiment of the present invention. The system has an antenna 3, an integrated receiver/decoder 2 (IRD), a remote controller 5, and a monitor 4. Packets of data are transmitted by a transponder on the satellite. Each transponder transmits data in a time share manner at a predetermined frequency. A tuner 21 of a decoder is tuned in to the frequency of the transponder corresponding to a channel, which is designated by a viewer so that the packets of digital data are received by the decoder.

The antenna 3 receives an encoded data signal sent from a satellite. The received encoded signal is decoded by the IRD. The antenna 3 has a low noise block down converter 3a (LNB). The LNB 3a converts a frequency of a signal sent from the satellite to another frequency. The converted signal is supplied to the IRD 3. The monitor 4 receives a signal from the IRD 3.

Figure 2:
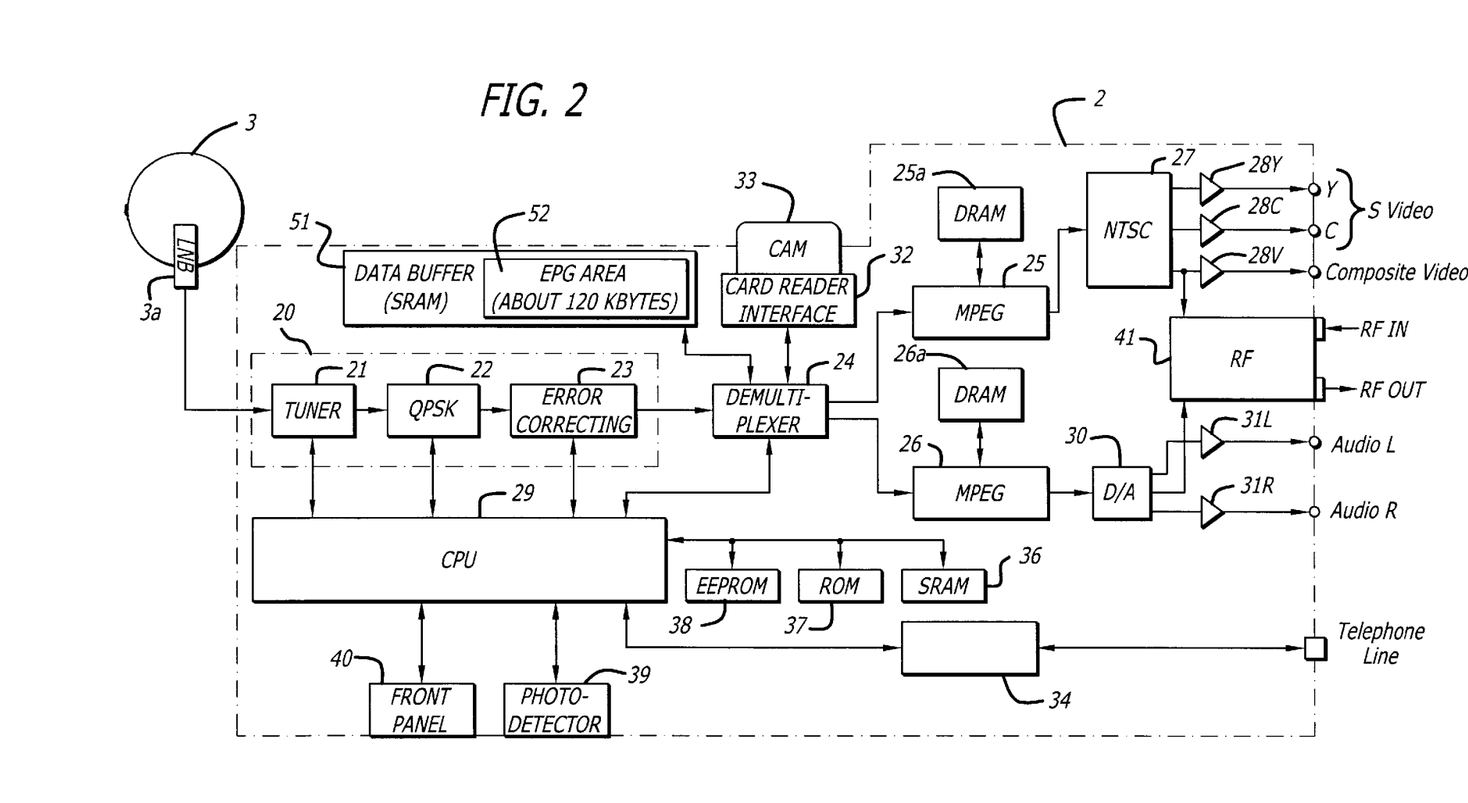
FIG. 2 is a block diagram of an integrated receiver/decoder (IRD) of an embodiment of the present invention.

FIG. 2 is a block diagram of an integrated receiver/decoder (IRD) of an embodiment of the present invention. A radio frequency (RF) signal output from the LNB 3a of the antenna 3 is supplied to a tuner 21 of a front end 20. The output from the tuner 21 is supplied to a quadrature phase shift keying (QPSK) demodulation circuit 22 for demodulation. The output from the QPSK demodulation circuit 22 is supplied to an error correcting circuit 23 for error correction. The data is received in encrypted and encoded (i.e., compressed) form.

The transport IC 24 receives the data stream, consisting of packets of data, from the error correcting circuit 23 and directs portions of the data stream to the appropriate circuit for processing. The digital data stream sent from a satellite includes headers for classifying the different portions of the data in the digital data stream. The transport IC stores the headers in registers and uses the headers to direct the data. The data stream sent from the satellite, includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG.

A conditional access module 33, includes a central processing unit (CPU), a read-only memory (ROM) and a random access memory (RAM). The conditional access module determines whether the user has the authorization to receive certain data, e.g., audio/video for a pay TV station, using the authorization information stored in its memory. Thus, if the conditional access module determines that the user is authorized access, a key to decrypt the incoming data is provided to the transport IC 24, which decrypts the data using the key provided. In one embodiment, a smart card is utilized. This card is inserted into the card reader interface 32 for interface to the transport IC 24. It is readily apparent to one skilled in the art that the conditional access module is not limited to smart cards and may be configured in other kinds of circuitry.

The MPEG video decoder 25 decodes the video signal received from the transport IC. Dynamic random access memory (DRAM) 25a, connected to the MPEG video decoder 25, is used for buffering and storage of video data during processing by the MPEG video decoder. The decoded digital video signal is supplied to a National Television System Committee (NTSC) encoder 27 and converted to a luminance signal (Y) and a chroma signal (C) which are respectively output through a buffer amplifier 28Y or 28C as an S video signal. A composite video signal is also output through a buffer amplifier 28V.

The MPEG audio decoder 26 decodes the digital audio signal. DRAM 26a, connected to the MPEG audio decoder 26, is used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R.

An RF modulator 41 mixes a composite signal output from the NTSC encoder 27 with an analog audio signal output from the D/A converter 30. The RF modulator 41 converts the mixed signal into an RF signal and outputs the RF signal therefrom.

The CPU 29 is the central control mechanism and executes code stored in the ROM 37 to perform certain functions of the system. For example, the CPU processes certain data to control the generation of the program list in accordance with the teachings of the present invention. In addition, the CPU receives and processes the user input, received from the front panel buttons or switches 40 and the photodetector circuit 39 to provide the user functionality and access to the system described herein. In addition, the CPU accesses user settings/preferences for processing of information and configuration of the system. The user settings are stored in the non-volatile memory, such as electrically erasable programmable read-only memory (EEPROM) 38. In addition, the CPU maintains a list of pointers, stored in static random access memory (SRAM) 36, to the channel information and program information stored in the SRAM 51. Thus, when a user wishes to display a form of the EPG on the screen, the CPU 29, accessing pointers stored in the SRAM 36, communicates to the transport IC 34 to retrieve the data from the data buffer (SRAM) 51 identified by the pointers. The CPU then formulates the format and other digital data which forms the guide or list on the screen and forwards the data representative of the guide/list to the transport IC 34 which forwards the data to the DRAM 25a of the MPEG video decoder 25 for subsequent output to the screen.

Figure 3:
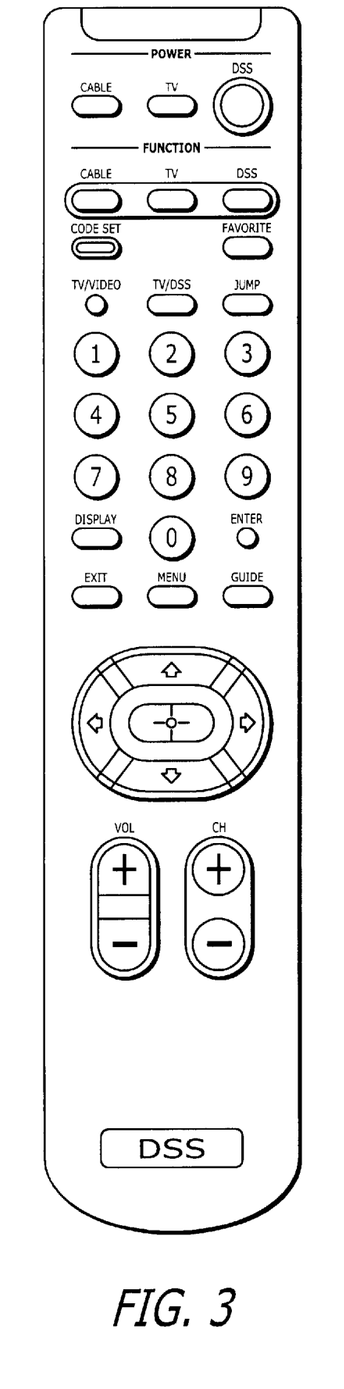
FIG. 3 is a remote controller of an embodiment of the present invention utilized by a user to transmit commands and make program selections.
Figure 4:
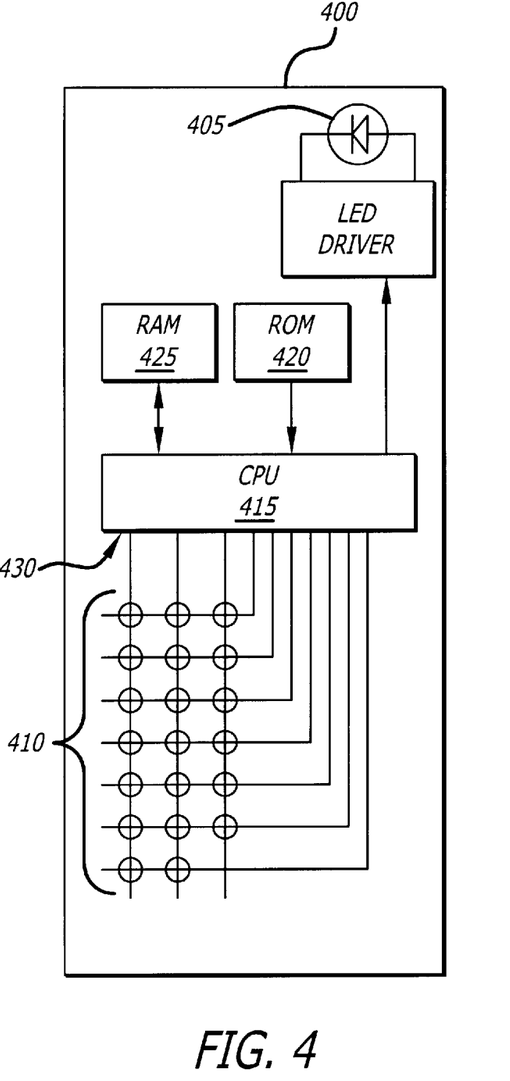
FIG. 4 is a block diagram of a remote controller of an embodiment of the present invention.

FIG. 3 is a remote controller of an embodiment of the present invention utilized by a user to transmit commands and make program selections. FIG. 4 is a block diagram of a remote controller of an embodiment of the present invention. The remote controller 400 has an infrared originating device 405, a set of operation buttons 410, a CPU 415, a ROM 420 and a RAM 425. The CPU 415 receives a signal sent from an operation button 410 through an input port 430. The signal is processed according to a program stored in the ROM 420. The RAM 425 is used as a working space so as to produce a transmitting code. The transmitting code is sent to the infrared originating device 405 through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad and an "ENTER" key. The set of operation buttons 410 enable the user to select programs through the electronic programming guide.

Figure 5:
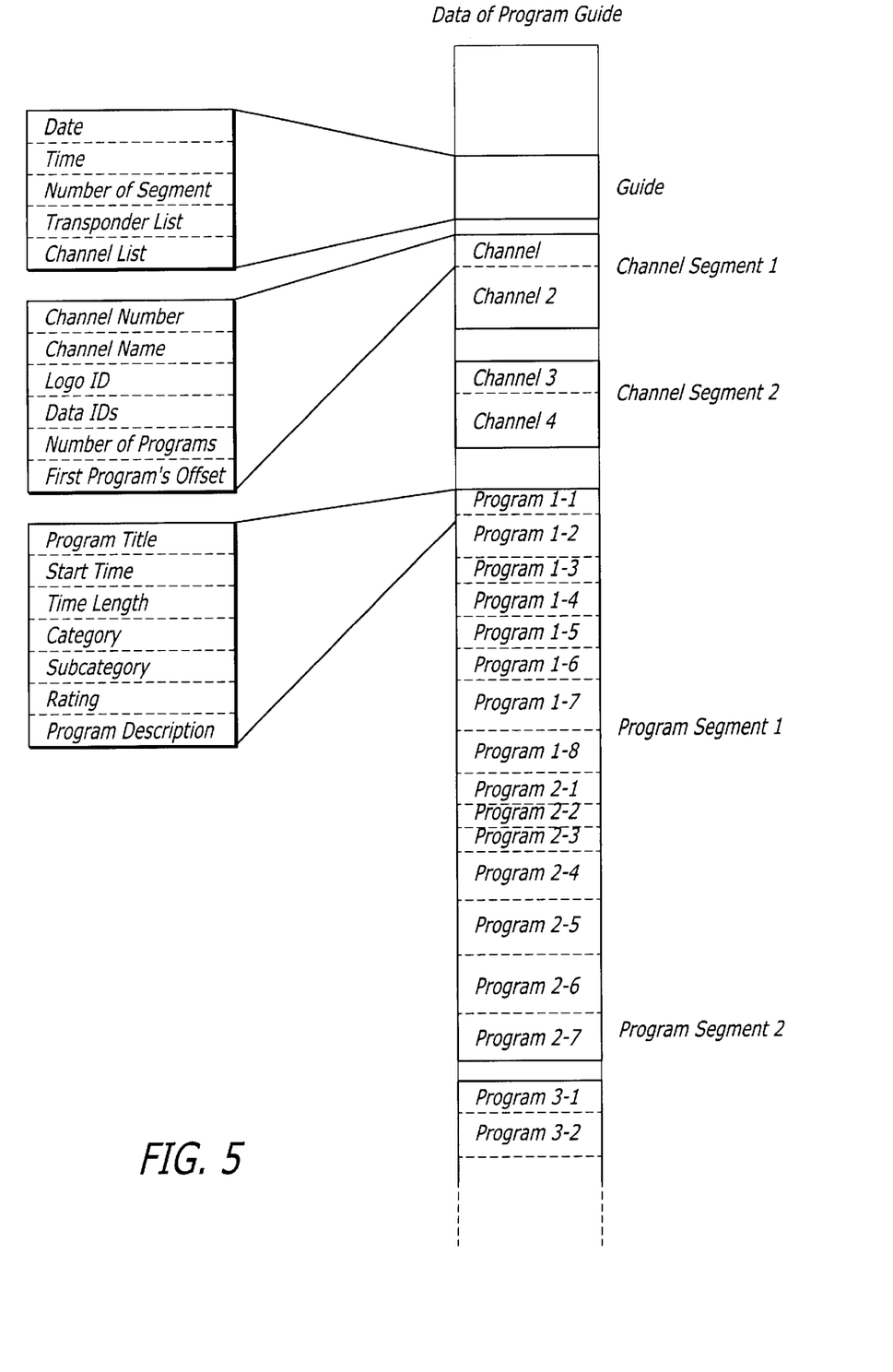
FIG. 5 is a block diagram of the data stored in a portion of the data buffer RAM of an embodiment of the present invention.

FIG. 5 is a block diagram of the data stored in a portion of the data buffer RAM of an embodiment of the present invention. As noted above, the RAM 51 stores EPG data including guide data, channel data, and program data. General information is included in the guide data, for example, the current date and time. The transponder list identifies the number of the transponder transmitting a segment. The channel list identifies the channel number of the first channel of a portion of data. The channel data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's movies or baseball, basketball, football for the sports category, the movie rating and program description that provides a detailed description of the program.

Figure 6:
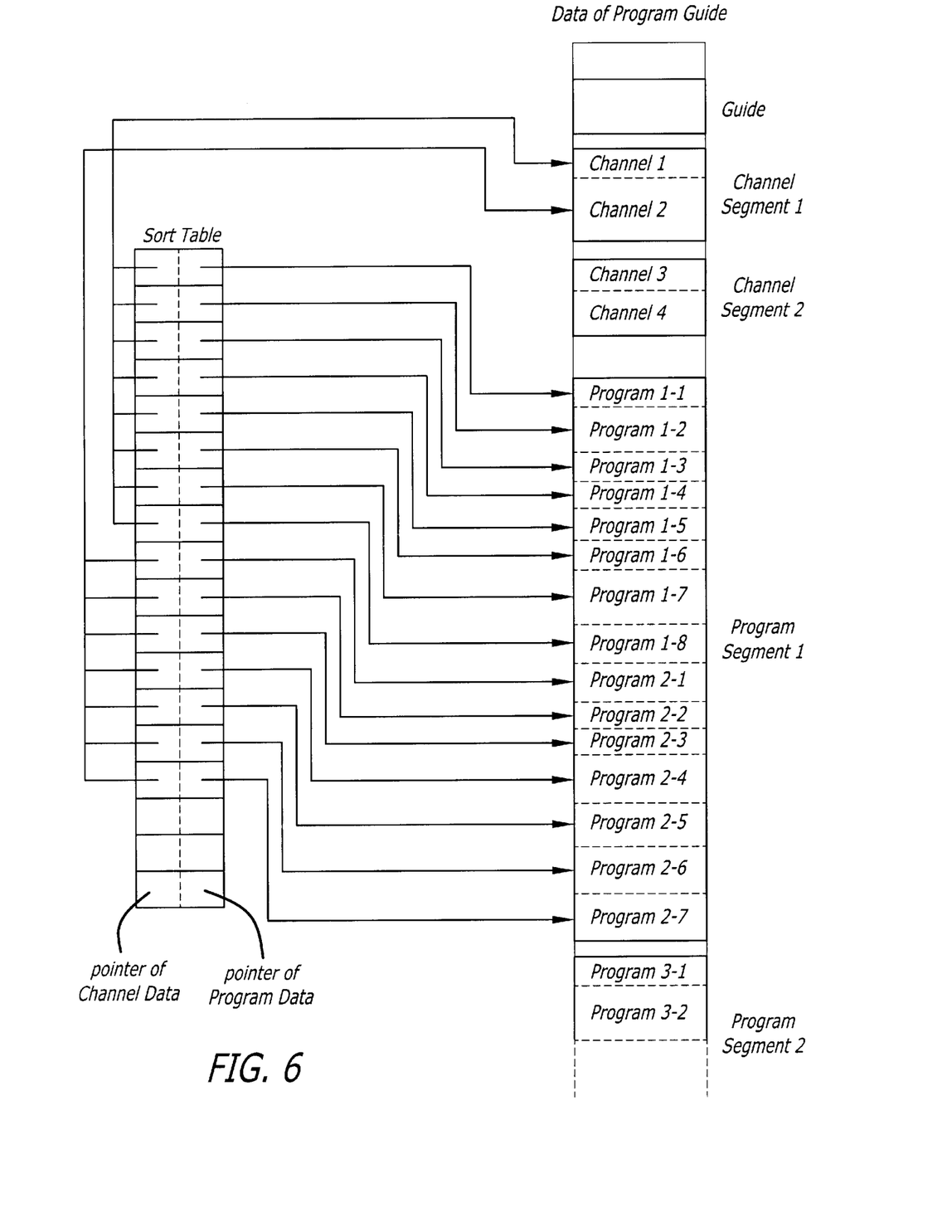
FIG. 6 shows how pointers to the EPG data are sorted for display on a guide on the user's television screen in an embodiment of the present invention.

FIG. 6 shows how pointers to the EPG data are sorted for display on a guide on the user's television screen in an embodiment of the present invention. As noted above, EPG data includes guide data, channel data and program data which are stored in the Data Buffer (RAM) of the IRD (as shown in FIG. 2). When a viewer selects a channel, the CPU of the system determines the packet containing the channel information and extracts the transponder number from the channel information. The system front end starts tuning in the frequency of the designated transponder so as to receive the data transmitting from that transponder. If a viewer does not select any channel, the last channel is preferably designated.

As noted above, the CPU generates a table of pointers 736 to the EPG stored in the memory. The table 736 is used for changing the order of channels or programs according to the information to be presented in the guide to the user. The table 736 includes an entry for the address pointer to the corresponding channel data and an entry to the corresponding program data.

A table for generating display information is stored in the ROM 37. Certain data from the table is read out from the ROM 37 and stored in DRAM 25a. Preferably the data is stored in compressed form. Therefore, when a character is displayed on a screen, the compressed character array is decoded so as to generate the character to be displayed. The encoder references a dictionary which includes a set of words and frequently used portions of words and numbers corresponding to each word or portion of a word. The encoder encodes each word to each number by using the dictionary. The decoder references the same dictionary as the encoder to perform the decode function. Once decoded, each character of the decoded word includes a character code corresponding to an American Standard Code for Information Interchange (ASCII) code. Nonvolatile memory (e.g., EEPROM 38) has two tables. The first table contains character bitmaps in the different fonts available for each character. The second table identifies the address in the first table at which to extract the character bitmap. The address is determined according to the character code. The bit map image of the character is transmitted to DRAM 25a and subsequently accessed to display the character on the screen.

In one embodiment of the present invention, the channel data is received from a predetermined transponder and the channel number and channel name are stored in DRAM 25a. Additional channel information such as the channel logo is stored in the ROM 36. The ROM 36 preferably includes a table of Logo IDs and the address of Logo Data stored in ROM 36. Therefore, once a Logo ID is determined, the address of the Logo Data is determined, retrieved and stored in DRAM 25a.

The channel data provides the beginning address of the program data for a particular program. The actual location on the screen at which the program information is displayed is dependent upon the format of the guide. For example, in a time-based system, the location where the program title is displayed is determined by the start time and time length stored in the program data.

Using this information downloaded from the satellite transmission, programming and channel selection information is provided to the viewer. In the system and method of one embodiment of the present invention, this information is provided to the user in several innovative manners in order to enable the viewer to easily determine and select stations or programs to be viewed.

Using a digital satellite broadcast system, a viewer may access and schedule many different types of programming. The combination of the broadcast system Electronic Programming Guide (EPG) and at least one videocassette recorder (VCR) coupled to the broadcast system allows the user to schedule programs for future viewing and easily schedule automatic tuning to future programming, automatic reminders of future programming, and automatic recording of future programming. Furthermore, the user may view a schedule of pay-per-view programming selected for future viewing and configure the system to purchase the future programming, remind of the future programming, and record the future programming. The use of a calendar-based television (TV) planner of an embodiment of the present invention allows the user to easily view and understand the schedule of selected TV activity, including timer scheduled events, events scheduled for recording, and scheduled pay-per-view selections, but the embodiment is not so limited. The scheduled TV activity may be past activity, present activity, and future activity. Moreover, the TV planner of an embodiment allows the user to seamlessly view and edit any broadcast system related activity and move between the EPG and the TV planner screens. Furthermore, by tracking the viewing activity of an individual or family, the TV planner of an embodiment of the present invention can easily assess the user's viewing preferences. The planner system may then suggest any broadcast activities in which the user might be interested, for example, a broadcast starring a particular actor, or a sports program involving a particular team.

Figure 7:
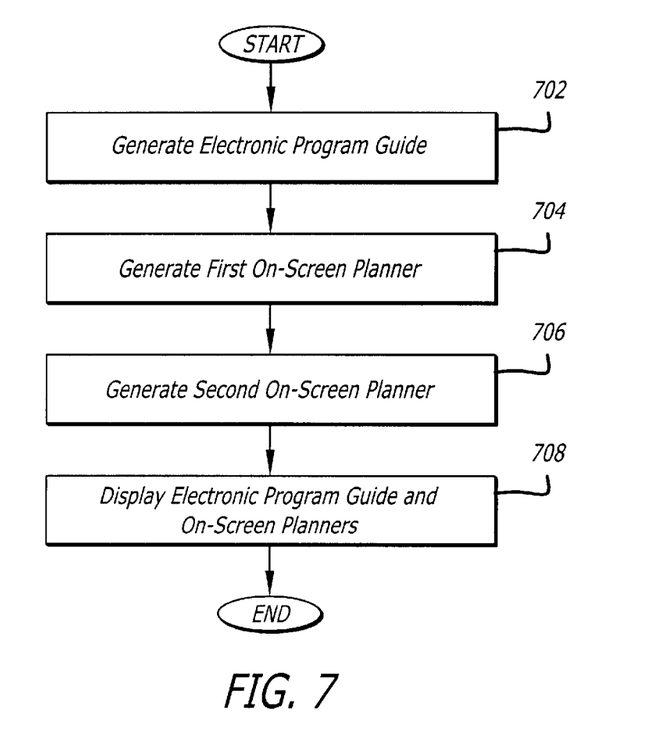
FIG. 7 is a flowchart for providing a calendar-based on-screen planner for broadcast events along with an electronic program guide.
Figure 8:
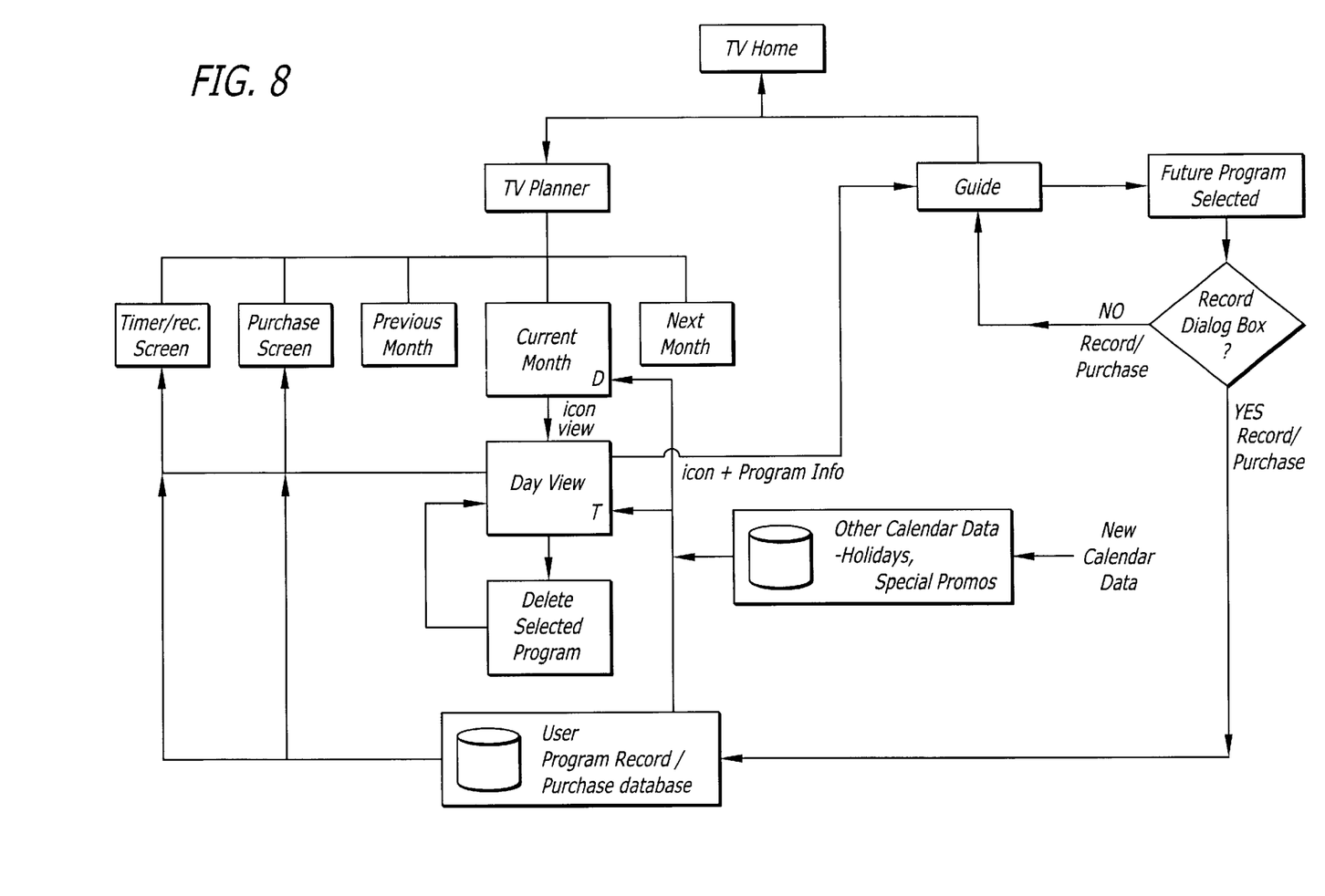
FIG. 8 is a TV planner feature/logic chart for an embodiment of the present invention.

FIG. 7 is a flowchart for providing a calendar-based on-screen planner for broadcast events along with an electronic program guide. FIG. 8 is a TV planner feature/logic chart for an embodiment of the present invention. With reference to FIG. 7, operation begins at step 702, at which at least one electronic program guide is generated and displayed representing programming on a number of channels. A first on-screen planner, or television (TV) planner, is generated comprising at least one monthly calendar view, at step 704. Previous months, the current month, and future months may be selected using the TV planner. The TV planner, which may be accessed from the electronic program guide, provides for a review of selected broadcast activity for a number of days of a selected month. The selected broadcast activity is selected from a group comprising broadcasts selected for automatic tuning, broadcasts selected for recording, and pay-per-view broadcasts selected for purchase.

A second on-screen planner, or daily view TV planner, is generated comprising at least one daily calendar view, at step 706. The daily view TV planner, which may be accessed from the TV planner, provides for review and editing of the selected broadcast activity for at least one selected day of the selected month. The daily view TV planner comprises a chronological list of each selected broadcast activity for a selected day of a selected month; the chronological list further comprises program titles, channel numbers, time, and a rating for each selected broadcast activity. The selected broadcast activity is represented on the TV planner and the daily view TV planner using a number of icons comprising a first set of icons for a future selected broadcast activity and a second set of icons for a completed selected broadcast activity. The electronic program guide and the on-screen planners are displayed on the screen, at step 708, in response to a user selection. The display of the electronic program guide and the on-screen planners may be superimposed over a broadcast of the currently selected and displayed program.

Figure 9:
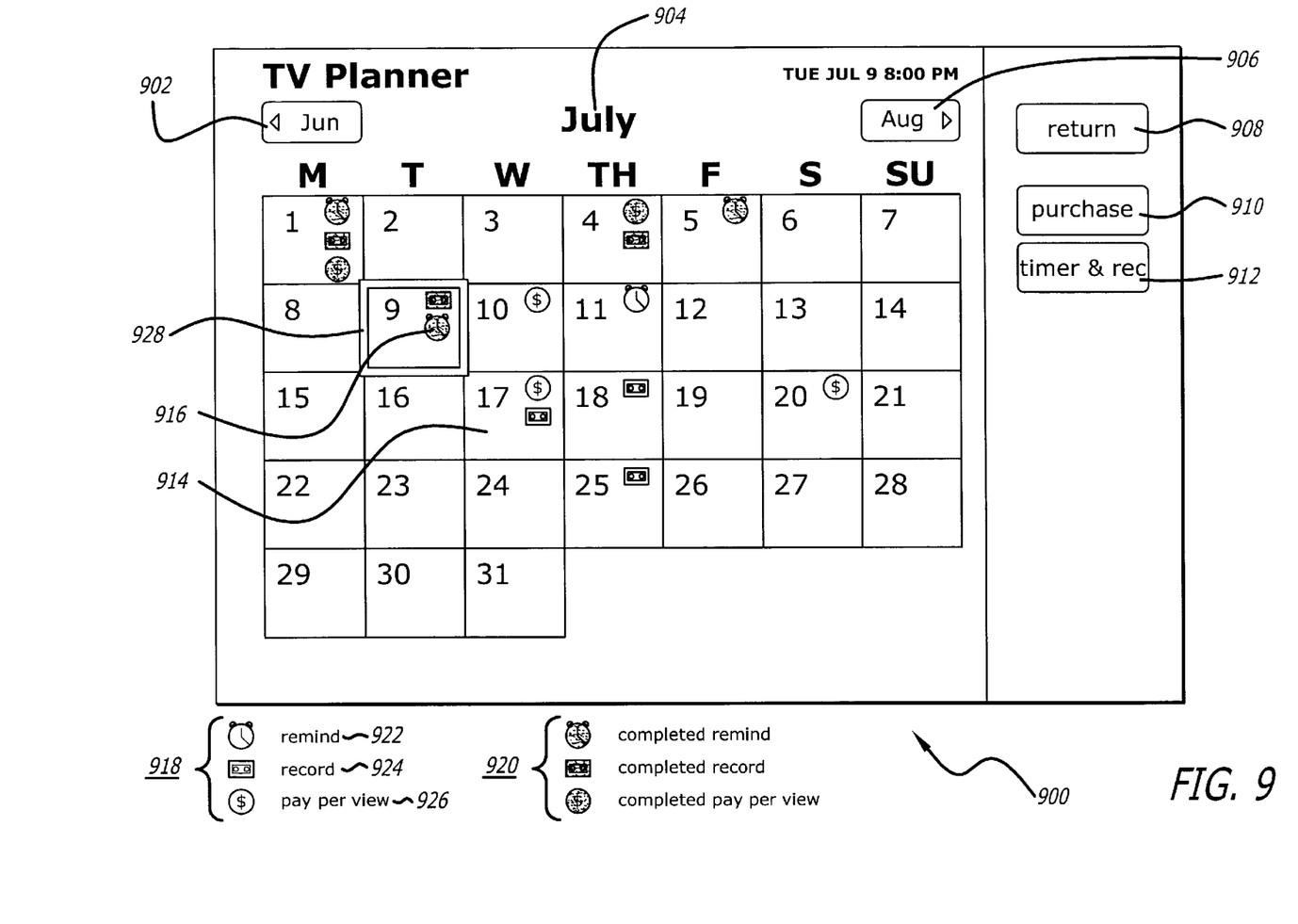
FIG. 9 is a TV planner of an embodiment of the present invention.

FIG. 9 is a TV planner 900 of an embodiment of the present invention. In an embodiment, the TV planner 900 is accessed from at least one EPG, but is not so limited. The TV planner 900, when accessed, is initially presented showing the current calendar month 904, but is not so limited. One button 902 of the TV planner 900 allows for scrolling back to previous months and another button 906 allows for scrolling forward to future months, allowing the user to select a month for display. A return button 908 returns a user to home, or the last screen that they were viewing prior to entering the TV planner 900. A purchase button 910 allows the user to review purchases comprising past, present, and future purchases. A timer/record button 912 takes a user to the timer and record page where automatic tuning using a timer and automatic recording can be scheduled, but the embodiment is not so limited.

The TV planner 900 of an embodiment of the present invention comprises a calendar display showing all days of a selected month 906. A first set of icons 918 are used to represent future events and a second set of icons 920 are used to represent completed events, but the embodiment is not so limited. The icons 918 of an embodiment comprise a "remind" icon 922, a "record" icon 924, and a "pay-per-view" icon 926, but are not so limited. When an activity is scheduled for a day an icon will be displayed on the appropriate calendar day. An icon may represent multiple activities of the representative type for the corresponding day, but is not so limited. For example, if two pay-per-view movies were purchased on a particular day, both purchases would be represented by the "pay-per-view" icon displayed on the particular day. A cursor 928 is displayed as a box outlining a day of the TV planner 900, and the cursor 928 is under control of the user via the remote device. The cursor 928 is used to select the day view TV planner, wherein a user views a detailed description of scheduled broadcast activity for the selected day.

Figure 10:
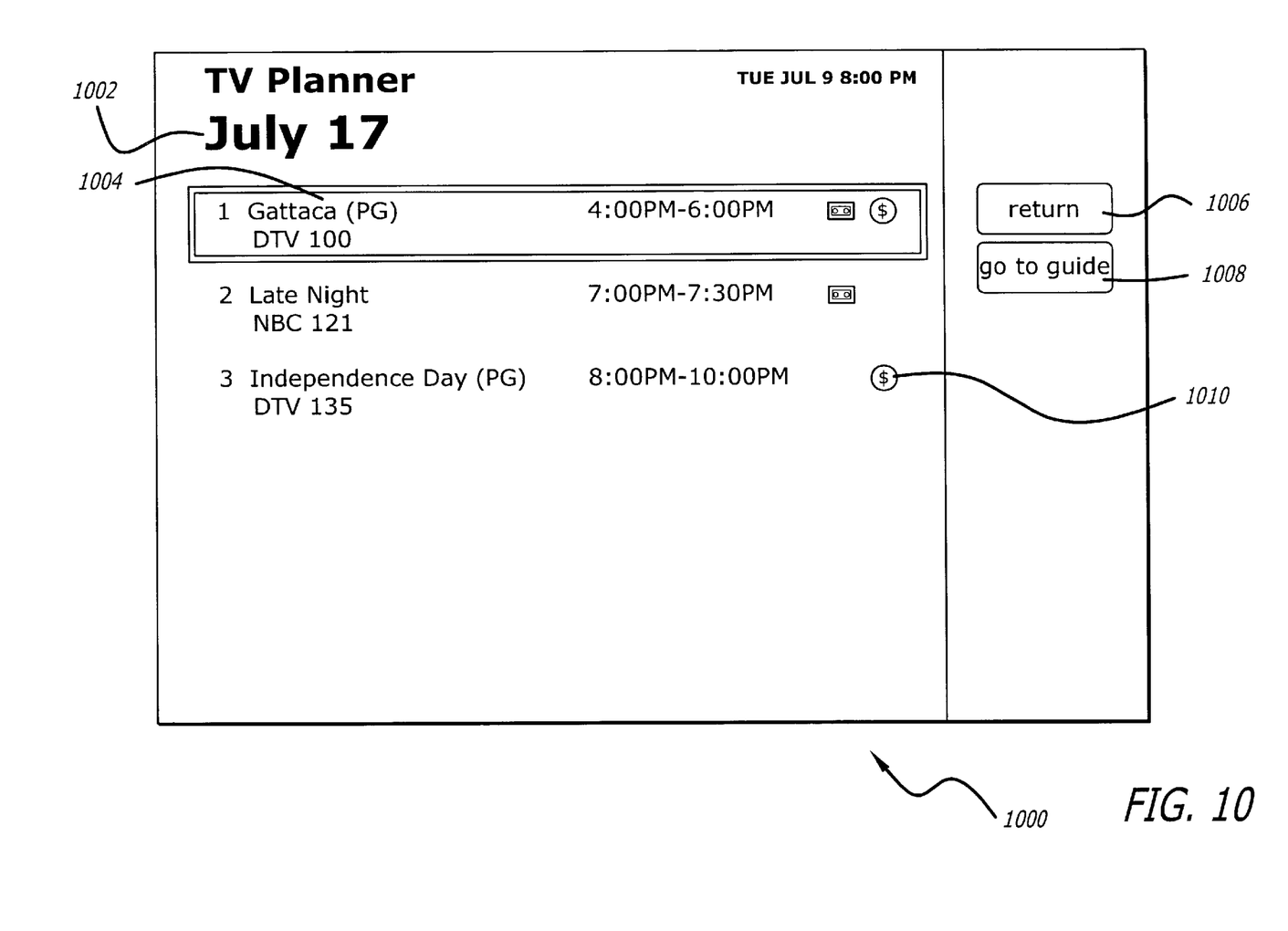
FIG. 10 is a daily view TV planner 1000 of an embodiment of the present invention.

FIG. 10 is a daily view TV planner 1000 of an embodiment of the present invention. When selected, the daily view TV planner 1000 is generated comprising a chronological list of each selected broadcast activity 1004 for a selected day 1002 of a selected month. Furthermore, the chronological list further comprises program titles, channel numbers, time, and a rating for each selected broadcast activity, but the embodiment is not so limited. For each scheduled selection represented on the daily view TV planner 1000, the icons 1010 are displayed that are representative of the activity scheduled. The icons 1010 displayed on the daily view TV planner 1000 correspond to the icons displayed on the same day of the TV planner 900, but the embodiment is not so limited. The daily view TV planner 1000 also comprises a return button 1006 and a go to guide button 1008. The return button 1006 returns the viewer to the TV planner display 900. The go to guide button 1008 takes the viewer to the electronic program guide for the scheduled day, wherein a quick way is available for a user to navigate the extended program guide, eliminating the need to scroll forward through each day of the program guide until the desired day is reached. In an embodiment, the go to guide button 1008 defaults to the time of the first scheduled item of the scheduled day, but the embodiment is not so limited. If the day view TV planner 1000 selected is beyond the availability of program information, the go to guide button 1008 will be inactive (dimmed). If there is no scheduled activity for the day, help text will indicate that there is nothing scheduled for this date. Furthermore, a user may edit the future scheduled activities using the day view TV planner 1000.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a multiple channel broadcasting system in which programs are broadcasted for display on a screen, a method for providing at least one on-screen planner of scheduled broadcast activity, comprising the steps of:

generating at least one electronic program guide representing programming on a plurality of channels;

generating a first on-screen planner comprising at least one monthly calendar view, wherein the first on-screen planner provides for a review of selected broadcast activity for a plurality of days of a selected month, the selected broadcast activity selected from a group comprising broadcasts selected for automatic tuning, broadcasts selected for recording, and pay-per-view broadcasts selected for purchase;

generating a second on-screen planner comprising at least one daily calendar view, the second on-screen planner providing for review and editing of the selected broadcast activity for at least one day of the selected month; and displaying the at least one electronic program guide and the at least one on-screen planner on the screen in response to a user selection.

2. The method of claim 1, wherein displaying comprises:

displaying a current calendar month comprising the selected broadcast activity using the first on-screen planner;

selecting a calendar month for display from a group comprising at least one previous calendar month and at least one future calendar month;

displaying the selected calendar month comprising the selected broadcast activity;

selecting a calendar day for display from the selected calendar month of the first on-screen planner; and displaying the selected calendar day comprising the selected broadcast activity.

3. The method of claim 1, further comprising displaying a system pointer that is manipulated in response to input by a user.

4. The method of claim 1, further comprising representing the selected broadcast activity on the first and second on-screen planners using a plurality of icons comprising a first set of icons for a future selected broadcast activity and a second set of icons for a completed selected broadcast activity.

5. The method of claim 4, wherein at least one of the plurality of icons represents a plurality of selected broadcast activities.

6. The method of claim 1, wherein generating a first on-screen planner comprises generating a calendar for a selected month comprising at least one icon displayed on each day for which a corresponding selected broadcast activity is scheduled.

7. The method of claim 1, wherein generating a second on-screen planner comprises generating a chronological list comprising each selected broadcast activity for a selected day of a selected month.

8. The method of claim 7, wherein the chronological list further comprises a program title, a channel number, a time, and a rating for each selected broadcast activity.

9. The method of claim 1, wherein the display of the at least one electronic program guide and the at least one on-screen planner is superimposed over a broadcast of a currently selected program.

10. The method of claim 1, further comprising:

tracking the viewing activity of a user;

assessing viewing preferences of the user; and suggesting at least one broadcast activity in which the user might be interested in response to the assessed viewing preferences.

11. A computer system comprising a processor configured to be coupled to a display device, the processor:

configured to generate at least one electronic program guide representing programming on a plurality of channels;

configured to generate a first on-screen planner comprising at least one monthly calendar view, wherein the first on-screen planner provides for a review of selected broadcast activity for a plurality of days of a selected month, the selected broadcast activity selected from a group comprising broadcasts selected for automatic tuning, broadcasts selected for recording, and pay-per-view broadcasts selected for purchase;

configured to generate a second on-screen planner comprising at least one daily calendar view, the second on-screen planner providing for review and editing of the selected broadcast activity for at least one day of the selected month; and configured to display the at least one electronic program guide and the first and second on-screen planners on the display device in response to a user selection.

12. The computer system of claim 11, wherein the processor is configured to display by being configured to:

display a current calendar month comprising the selected broadcast activity using the first on-screen planner;

select a calendar month for display from a group comprising at least one previous calendar month and at least one future calendar month;

display the selected calendar month comprising the selected broadcast activity;

select a calendar day for display from the selected calendar month of the first on-screen planner; and display the selected calendar day comprising the selected broadcast activity.

13. The computer system of claim 11, wherein the processor is further configured to display a system pointer that is manipulated in response to input by a user.

14. The computer system of claim 11, wherein the processor is further configured to represent the selected broadcast activity on the first and second on-screen planners using a plurality of icons comprising a first set of icons for a future selected broadcast activity and a second set of icons for a completed selected broadcast activity, wherein at least one of the plurality of icons represents a plurality of selected broadcast activities.

15. The computer system of claim 11, wherein the processor is configured to generate a first on-screen planner by generating a calendar for a selected month comprising at least one icon displayed on each day for which a corresponding selected broadcast activity is scheduled.

16. The computer system of claim 11, wherein the processor is configured to generate a second on-screen planner by generating a chronological list comprising each selected broadcast activity for a selected day of a selected month, wherein the chronological list further comprises a program title, a channel number, a time, and a rating for each selected broadcast activity.

17. The computer system of claim 11, wherein the display of the at least one electronic program guide and the at least one on-screen planner is superimposed over a broadcast of a currently selected program.

18. The computer system of claim 11, wherein the processor is further configured to:

track the viewing activity of a user;

assess viewing preferences of the user; and suggest at least one broadcast activity in which the user might be interested in response to the assessed viewing preferences.

19. A system for generating at least one on-screen planner of scheduled broadcast activity in a multiple channel broadcasting system in which programs are broadcasted for display, comprising:

at least one electronic program guide representing programming on a plurality of channels;

a first on-screen planner comprising at least one monthly calendar view, wherein the first on-screen planner provides for a review of selected broadcast activity for a plurality of days of a selected month, the selected broadcast activity selected from a group comprising broadcasts selected for automatic tuning, broadcasts selected for recording, and pay-per-view broadcasts selected for purchase;

a second on-screen planner comprising at least one daily calendar view, the second on-screen planner providing for review and editing of the selected broadcast activity for at least one day of the selected month; and a screen for display of the at least one electronic program guide and the at least one on-screen planner in response to a user selection.

20. The system of claim 19, wherein displaying comprises:

displaying a current calendar month comprising the selected broadcast activity using the first on-screen planner;

selecting a calendar month for display from a group comprising at least one previous calendar month and at least one future calendar month;

displaying the selected calendar month comprising the selected broadcast activity;

selecting a calendar day for display from the selected calendar month of the first on-screen planner; and displaying the selected calendar day comprising the selected broadcast activity.

21. The system of claim 19, further comprising a system pointer that is manipulated in response to input by a user.

22. The system of claim 19, further comprising a plurality of icons comprising a first set of icons that represent a future selected broadcast activity and a second set of icons that represent a completed selected broadcast activity, wherein at least one of the plurality of icons represents a plurality of selected broadcast activities.

23. The system of claim 19, wherein the first on-screen planner comprises a calendar for a selected month comprising at least one icon displayed on each day for which a corresponding selected broadcast activity is scheduled.

24. The system of claim 19, wherein the second on-screen planner comprises a chronological list comprising each selected broadcast activity for a selected day of a selected month, wherein the chronological list further comprises a program title, a channel number, a time, and a rating for each selected broadcast activity.

25. The system of claim 19, wherein the display of the at least one electronic program guide and the at least one on-screen planner is superimposed over a broadcast of a currently selected program.

26. A computer readable medium containing executable instructions which, when executed in a processing system, causes the system to perform the steps for a method for providing at least one on-screen planner of scheduled broadcast activity, the method comprising:

generating at least one electronic program guide representing programming on a plurality of channels;

generating a first on-screen planner comprising at least one monthly calendar view, wherein the first on-screen planner provides for a review of selected broadcast activity for a plurality of days of a selected month, the selected broadcast activity selected from a group comprising broadcasts selected for automatic tuning, broadcasts selected for recording, and pay-per-view broadcasts selected for purchase;

generating a second on-screen planner comprising at least one daily calendar view, the second on-screen planner providing for review and editing of the selected broadcast activity for at least one day of the selected month; and displaying the at least one electronic program guide and the at least one on-screen planner on the screen in response to a user selection.

27. The computer readable medium of claim 26, wherein displaying comprises:

displaying a current calendar month comprising the selected broadcast activity using the first on-screen planner;

selecting a calendar month for display from a group comprising at least one previous calendar month and at least one future calendar month;

displaying the selected calendar month comprising the selected broadcast activity;

selecting a calendar day for display from the selected calendar month of the first on-screen planner; and displaying the selected calendar day comprising the selected broadcast activity.

28. The computer readable medium of claim 26, further comprising displaying a system pointer that is manipulated in response to input by a user.

29. The computer readable medium of claim 26, further comprising representing the selected broadcast activity on the first and second on-screen planners using a plurality of icons comprising a first set of icons for a future selected broadcast activity and a second set of icons for a completed selected broadcast activity, wherein at least one of the plurality of icons represents a plurality of selected broadcast activities.

30. The computer readable medium of claim 26, wherein generating a first on-screen planner comprises generating a calendar for a selected month comprising at least one icon displayed on each day for which a corresponding selected broadcast activity is scheduled.

31. The computer readable medium of claim 26, wherein generating a second on-screen planner comprises generating a chronological list comprising each selected broadcast activity for a selected day of a selected month, wherein the chronological list further comprises a program title, a channel number, a time, and a rating for each selected broadcast activity.

32. The computer readable medium of claim 26, wherein the display of the at least one electronic program guide and the at least one on-screen planner is superimposed over a broadcast of a currently selected program.

33. The computer readable medium of claim 26, wherein the method further comprises:

tracking the viewing activity of a user;

assessing viewing preferences of the user; and suggesting at least one broadcast activity in which the user might be interested in response to the assessed viewing preferences.

* * * * *